United States Patent [19]

Caris

[11] Patent Number: 4,518,214

[45] Date of Patent: May 21, 1985

[54] DEVICE FOR THE ELECTRIC CONNECTION OF A CYLINDRICAL CONDUCTOR

[76] Inventor: Marcel Caris, 16, rue Francois Mansart, 92350 Le Plessis Robinson, France

[21] Appl. No.: 486,320

[22] Filed: Apr. 19, 1983

[30] Foreign Application Priority Data

Apr. 26, 1982 [FR] France ............................... 82 07140

[51] Int. Cl.$^3$ .................... H01R 13/629; H01R 11/20; B23P 23/00; B23P 19/00

[52] U.S. Cl. ................................ 339/74 R; 339/75 R; 339/98; 339/108 R; 29/753; 29/566.3

[58] Field of Search ..................... 339/96, 97 R, 97 C, 339/97 P, 98, 99 R, 74 R, 75 R, 75 M, 108 R, 110 R; 29/566.4, 748-751, 566.3, 753

[56] References Cited

U.S. PATENT DOCUMENTS

| | | | |
|---|---|---|---|
| 3,761,866 | 9/1973 | Sedlacek | 339/97 P |
| 4,029,384 | 6/1977 | Reinwall, Jr. | 339/98 |
| 4,350,405 | 9/1982 | Yapoudjian | 339/97 P |
| 4,370,009 | 1/1983 | Dola | 339/97 R |

FOREIGN PATENT DOCUMENTS

| | | | |
|---|---|---|---|
| 648254 | 9/1964 | Belgium . | |
| 2840912 | 4/1980 | Fed. Rep. of Germany | 339/98 |
| 2210843 | 7/1974 | France . | |
| 2248629 | 5/1975 | France . | |
| 2431780 | 2/1980 | France . | |

*Primary Examiner*—Gil Weidenfeld
*Assistant Examiner*—Steven C. Bishop

[57] ABSTRACT

A device for electrically connecting a cylindrical conductor, of the kind comprising at least one fork whose members each have a cutting edge, the conductor to be connected being forced in and gripped between such cutting edges, wherein each member of the fork is prolonged by an arm, the device also comprising a member for inserting and extracting the conductor to be connected, such member having a shape such that it can move the ends of the arms away from one another when the conductor is introduced and keep them apart to a distance such that the distance apart of the cutting edges at the level of the conductor is slightly less than its diameter.

12 Claims, 7 Drawing Figures

DEVICE FOR THE ELECTRIC CONNECTION OF A CYLINDRICAL CONDUCTOR

The invention relates to electric connection devices, more particularly to a device of the kind specified which enables the insulating material to be stripped at the same time as the conductor is connected.

BACKGROUND OF THE INVENTION

Conventionally, electric conductors are connected to contact or distribution elements, such as those used in primary or subsidiary distribution installations, by welding or screwing, or by winding the conductor around a terminal of square or rectangular section. All these methods strip the conductor before the connection is made, and this substantially increases the time taken by the operation. To obviate this disadvantage, use has been made more particularly in distribution installations of connecting means formed by so-called "insulation-displacing" or "self-stripping connection" terminals. Connecting devices of that kind comprise two lips each having a cutting edge which cuts the insulation when the conductor is introduced between the lips. The conductor is then gripped between the cutting lips, thus ensuring simultaneously its mechanical retention and the electric contact.

Such devices have other disadvantages, due to the fact that the cutting edges contact one another in the absence of the conductor, which must be forced in between the edges. Because of the pressure exerted by the two members of the fork, the conductor is subjected to an attack which may result in the appearance of a certain number of defects during operation. During introduction the conductor is subjected to rolling aggravated by planing, the main effect of this being to reduce the section of the conductor at the level of the connecting point. The pressure unequally distributed over the periphery of the conductor sets up stresses in the metal and may cause the start of breakage with an adverse effect on the satisfactory behavior of the connection, more particularly under vibrating conditions. If the conductor is a cabled conductor, there is a risk that some of the strands may be severed, thus reducing the section of the conductor and increasing the current density.

PROBLEM

It is an aim of the invention to obviate these disadvantages by providing a connecting device enabling the conductor to be stripped at the same time as it is introduced, without setting up excessive stresses at the level of the connecting point.

BRIEF SUMMARY OF THE INVENTION.

The invention mainly provides a device for electrically connecting a cylindrical conductor, of the kind comprising at least one fork whose members each have a cutting edge, the conductor to be connected being forced in and gripped between each cutting edges, wherein each member of the fork is prolonged by an arm, the device also comprising a member for inserting and extracting the conductor to be connected, such member having a shape such that it can move the ends of the arms away from one another when the conductor is introduced and keep them apart to a distance such that the distance apart of the cutting edges at the level of the conductor is slightly less than its diameter.

In this way, since the distance between the cutting edges of the fork is kept to a value slightly less than the diameter of the conductor, the latter does not act as a laminating roll in the contact zone during its introduction.

According to another feature of the device according to the invention, each of the arms has a semi circular boss at its end remote from the fork.

In a preferred embodiment of the invention, the member for inserting and extracting the conductor to be connected comprises two cheeks enclosing a central member, each of the cheeks comprising a notch enabling the conductor to be connected to be seized, the central member having a shape such that it has in edge section:

two inclined planes adapted to move the ends of the arms progressively apart when the member is introduced therebetween, two parallel planes connecting with the inclined planes, and two concavities connecting with the parallel planes via inclined planes and adapted to receive the bosses, so as to ensure the retention of the member for inserting and extracting the conductor to be connected.

In a variant embodiment each cutting edge has at one of its ends a small tip enabling the insulating material enclosing the conductor to be connected to be cut.

If necessary each cutting edge is formed with a notch defining a recess receiving the conductor to be connected; the recess can be of square or circular section. A number of devices according to the invention can also be disposed side by side, the members of the different forks all being connected to the same current supply.

A special tool is required for maneuvering the member for inserting and extracting the conductor to be connected. The tool mainly comprises: a tool body, a support which is connected via a first spring to the tool body and can make a traversing movement in relation thereto, and a second spring which is attached to the support and is adapted to retain the member for inserting and extracting the conductor to be connected in a recess with which the support is formed.

Advantageously the tool also has a blade having a cutting edge, the blade being connected to the tool body and adapted to slide on a face of the support, so as to cut the end of the cable when it is introduced.

Finally, according to another possible feature of the invention, the tool comprises at one of its ends two bosses adapted to co-operate with two notches with which the member for inserting and extracting the conductor to be connected is formed, so as to facilitate the extraction of such member.

DESCRIPTION OF THE DRAWINGS.

The invention will be better understood from the following purely illustrative, non-limited description with reference to the accompanying drawings, wherein.

DETAILED DESCRIPTION OF THE PREFERRED EMBODIMENTS

Figures 1, 2:
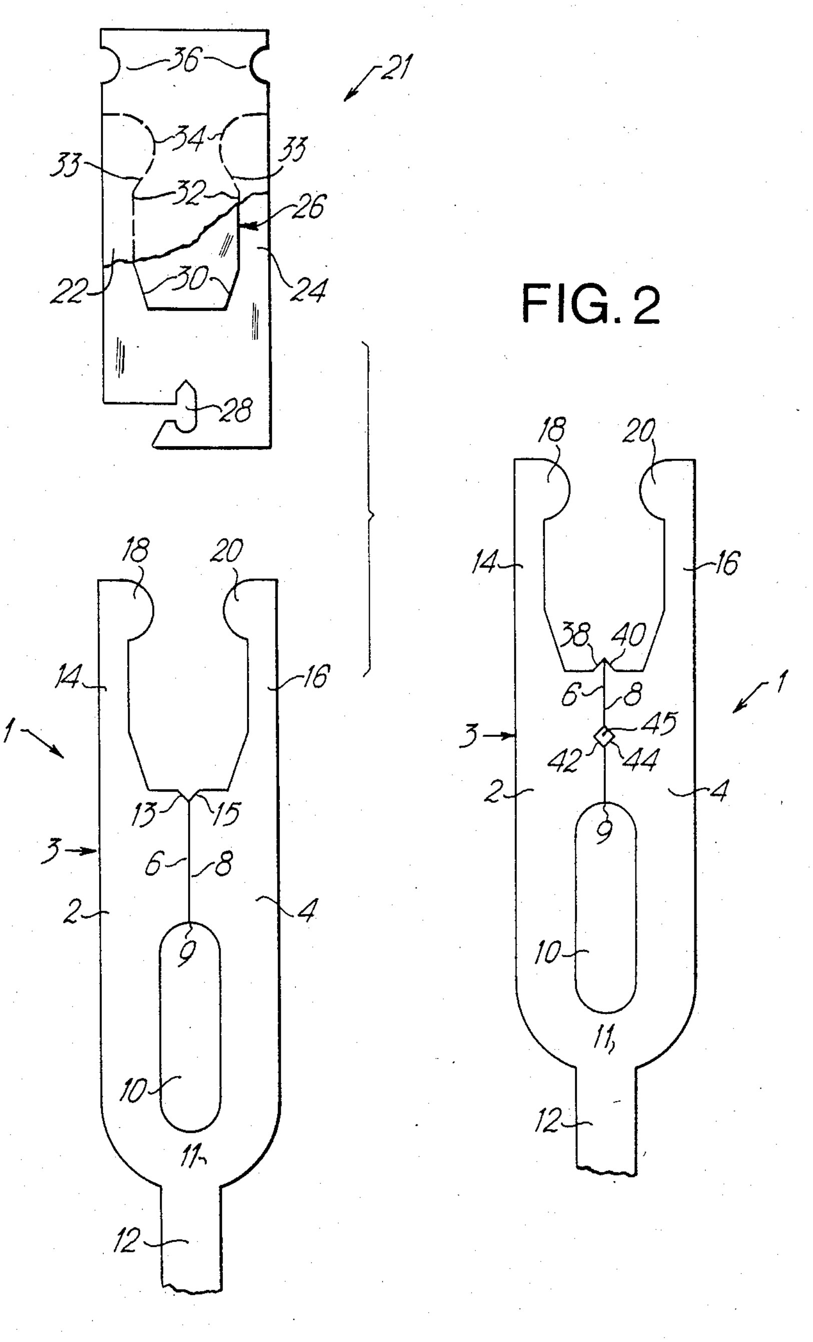
FIG. 1 is a diagrammatic elevation of a first embodiment of the device according to the invention, showing separately the member comprising the fork and the member for inserting and extracting the conductor to be connected.
FIG. 2 is a diagrammatic view, similar to FIG. 1, illustrating a second embodiment of the device.

FIG. 1 shows a connecting member 1 whose central portion 3 is a fork whose two members 2 and 4 are bounded by cutting edges 6 and 8 respectively defining a slot 9 into which a conductor to be connected is introduced. At the end of the slot 9 are two inclined planes 13 and 15 for facilitating the centering of the conductor and its introduction into the slot 9 when it is inserted. In the absence of the conductor the cutting edges 6 and 8 contact one another. An aperture is left between a current supply 12 and the fork 3, to increase the resilience of the connecting member 1. The effect of this arrangement is to throw the stresses caused by the pressure of the members 2 and 4 on to the conductor in a zone 11 lying between the current supply 12 and the aperture 10. According to the invention the members 2 and 4 are prolonged by arms 14 and 16 respectively terminated by semi-circular bosses 18 and 20. The radius of each of the bosses must be equal to the largest radius of the conductor which can admit the connecting element.

FIG. 1 shows above the connecting member 1 a member for inserting and extracting the conductor. Such member 21 is made up of two cheeks 22 and 24 enclosing a central member 26. To make the drawing clearer, the cheek 22 has been partly cut away in the drawing. Each of the cheeks 22 and 24 has at one end a notch 28 into which the conductor is placed before it is introduced into the connecting member 1. FIG. 1 also shows how the central member 26 has successively, from top to bottom:

two inclined planes 30 whose function is to move the bosses 18 and 20 of the arms 14 and 16 progressively apart so as to ensure the opening of the slot 9 prior to the introduction of the conductor;

two parallel planes 32 which keep the arms 14 and 16 apart, via the bosses 18 and 20, during the introduction of the conductor into the slot 9, the distance apart of the arms 14 and 16 being therefore adjusted to a value slightly less than the diameter of the conductor, and two concavities 34 enabling the bosses 18 and 20 to be liberated at the end of travel, when the conductor is in place, and serving to retain the member for inserting and extracting the conductor to be connected between the arms 14 and 16. The parallel planes 32 connect with the concavities 34 via two inclined planes 33. Of course, the member 21 for inserting and extracting the conductor to be connected remains in place once the conductor is connected, and as many different members are required as the conductor has diameters; moreover, the distance between the parallel planes 32 is such that, once the conductor has been placed in the final position, a clearance is left between such planes and the inside of the arms 14 and 16. FIG. 1 also shows how the member 21 for inserting and extracting the conductor can have at its end remote from the notch 28 two notches 36 which serve for extracting the conductor, and whose function will be stated precisely hereinafter.

FIG. 2 illustrates a second embodiment of the device according to the invention, having a connecting member 1 whose central portion 3 is a fork made up of two members 2 and 4 prolonged by arms 14 and 16 terminated by bosses 18 and 20. However, in the embodiment illustrated in FIG. 2, the cutting edges 6 and 8 terminate in small tips 38 and 40 respectively, whose function is to strip the conductor and remove the insulation from it at the moment of introduction. Moreover, the center of each of the edges 6 and 8 is formed with notches 42 and 44 respectively for defining a recess 45 of square section for the conductor to be connected. In this case, when the conductor is in place, the edges 6 and 8 are at a lesser distance apart than in the case shown in FIG. 1, since the conductor is locked in the recess 45, whose size is slightly less than the diameter of the conductor.

Figure 3:
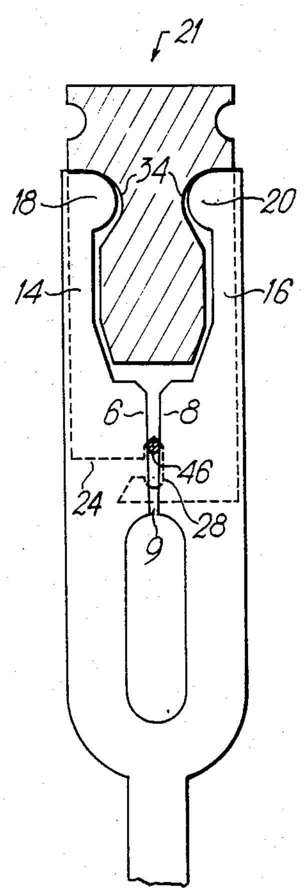
FIG. 3 is a diagrammatic view showing the member for inserting and extracting the conductor to be connected in place in the device illustrated in FIG. 1.
Figure 4:
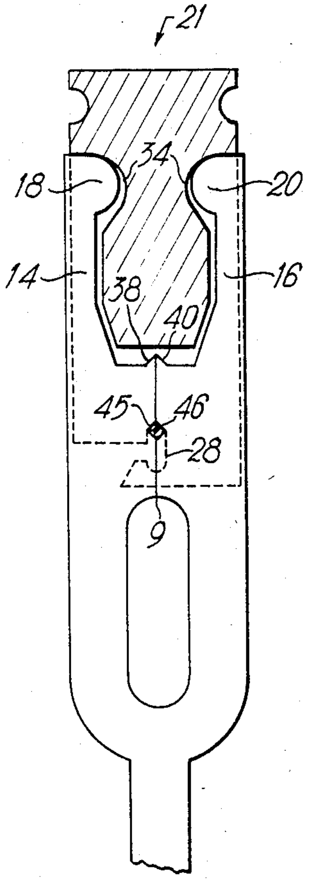
FIG. 4 is a diagrammatic view, similar to FIG. 3, showing the member for inserting and extracting the conductor to be connected in place in the device illustrated in FIG. 2.

FIGS. 3 and 4 show the device once the conductor is in place. To make the drawings clearer, FIGS. 3 and 4 do not show the check 22 of the member 21 for inserting and extracting the conductor. FIG. 3 shows the bosses 18 and 20 of the arms 14 and 16 in place in the concavities 34 of the member for inserting and extracting the conductor. The conductor 46 is also shown gripped between the lips 6 and 8 of the slot 9, which remain moved apart from one another. It can also be seen that the conductor 46 is applied against the upper part of the notch 28 with which the cheek 22 of the member 21 is formed. When the conductor is introduced, the arms 14 and 16 are moved apart enough for the edges of the slot 9 to be kept apart at a distance such that the distance apart of the lips 6 and 8 is only slightly less than the diameter of the conductor 46. In this way the conductor is protected against being "rolled" (i.e. acting as a laminating roll) during its introduction into the slot, and subsequently it is effectively retained, while avoiding the stresses which might be harmful to its mechanical behavior during operation. FIG. 4 is a view similar to FIG. 3, showing the conductor in place in the connecting member illustrated in FIG. 2. The operational principle is the same, but instead of the lips 6 and 8 of the slot 9 cutting the insulating material when the conductor is introduced, this operation is performed by the tips 38 and 40. Moreover, the lips 6 and 8 of the fork remain kept apart only by a minimum value (not shown), since the conductor is retained in the recess of square section 45. This arrangement, although different from that shown in FIG. 3, has the same advantage as regards the absence of mechanical stresses on the conductor 46 at the level of the connecting point.

Figure 5:
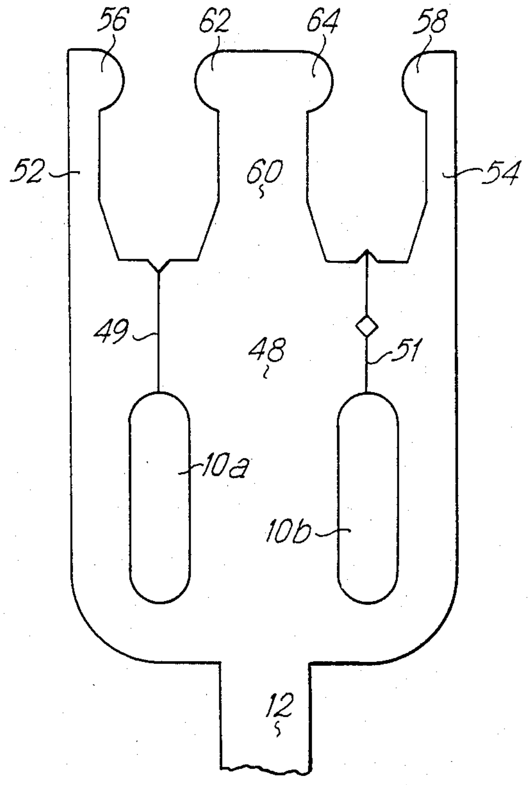
FIG. 5 is a diagrammatic elevation showing how a number of devices according to the invention can be connected to a single current supply.

FIG. 5 illustrates a variant, given by way of example, in which a number of devices according to the invention are connected to the same current supply. The device takes the form of a single large connecting member 46 formed with two apertures 10*a* and 10*b* prolonged, on the side remote from the current supply 12, by two slots 49 and 51 respectively. The member 40 has at its end remote from the current supply 12 two lateral arms 52 and 54 terminating in semi circular bosses 56 and 58 and the central arm 60 terminating in the two semi circular bosses 62 and 64. It can therefore be seen that the left-hand part of the member 48 is similar to the connecting member illustrated in FIG. 1, while its right-hand part is similar to the connecting member illustrated in FIG. 2.

The device illustrated in FIG. 5 operates identically with the device illustrated in the preceding drawings. Of course, although the member illustrated in FIG. 5 enables two conductors to be connected to a single current supply 12, any number of conductors might be connected via such a device to a single current supply. It is enough to give the various arms, as 52, 60 and 54 the necessary resilience for them to be moved apart by the member 21 for inserting and extracting the conductor, for example by providing extra slots in the arms, as 60, having two bosses, as 62 and 64.

Figure 6:
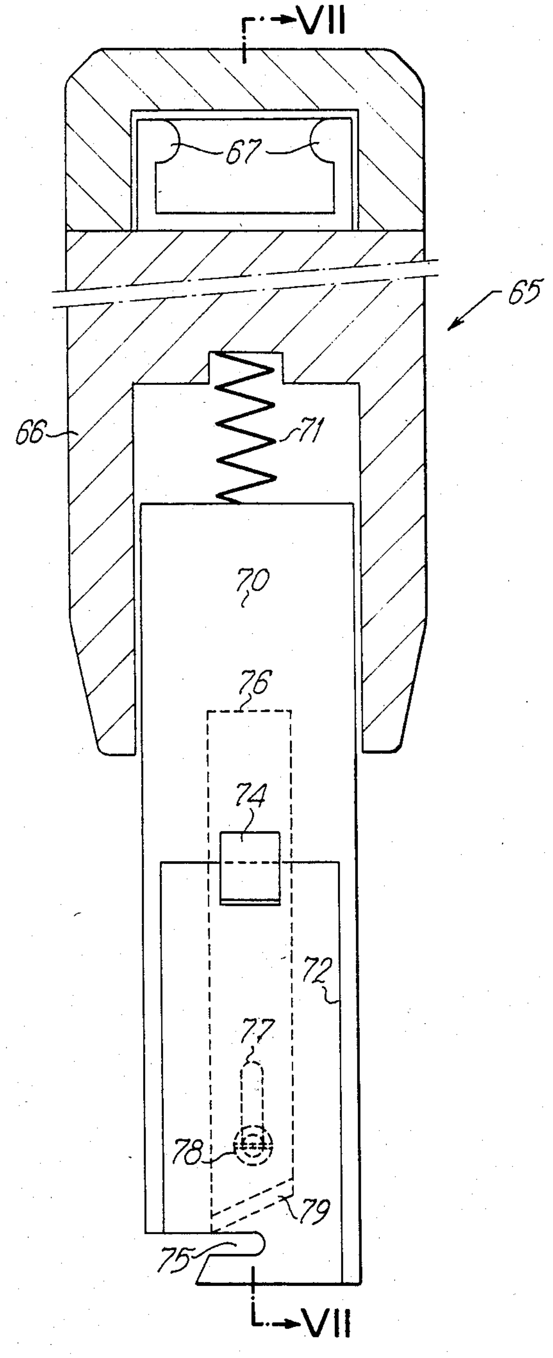
FIG. 6 is a diagrammatic, partially sectioned elevation showing the tool used for manipulating the member for inserting and extracting the conductor to be connected.
Figure 7:
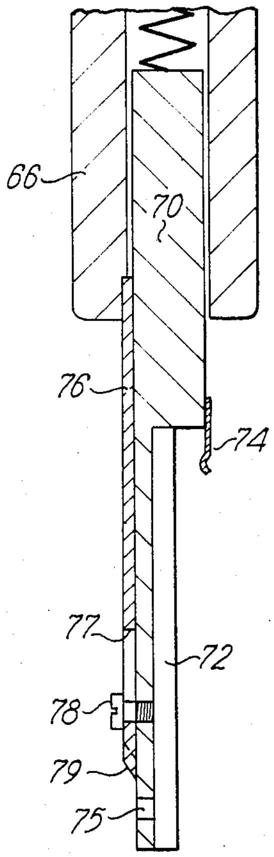
FIG. 7 is a diagrammatic view sectioned along the line VII—VII in FIG. 6.

To facilitate the positioning and extraction of the member 21, a special tool is required. FIG. 6 shows how the tool 65 is mainly made up of a tool body 66 having at one of its ends two bosses 67 adapted to co-operate with notches 36 in the inserting member 21 (cf. FIG. 1) to facilitate the extraction of such member. At the other end of the tool body is a support 70 which is connected via a spring 71 to the tool body and can make a traversing movement in relation thereto. At the end of the support 70 remote from the end to which the spring 71 is attached there is a recess 72 adapted to receive the inserting and extracting member. A blade spring 74 retains such member in the recess 72. At the end of the support 70 furthest away from the tool body there is a notch 75 enabling the cable to be connected to be received. FIGS. 6 and 7 also show a blade 76 which is connected to the tool body 66 and can glide on a face of the support 72 when the latter moves in relation to the tool body 66 during the compression or expansion of the spring 71. Such movement is permitted by an aperture 77 with which the blade 76 is formed and through which a retaining screw 78 extends. At the end of the blade 76 closest to the notch 75 in the support 70 there is a cutting edge 79 enabling the end of the cable to be severed after it has been introduced into the connecting member.

The inserting and extracting member is put in place by means of the tool 65 in the following manner: first the inserting and extracting member is introduced into the recess 72, in which it is retained by a spring 74, its position being such that the notch 28 in the cheeks 22 and 24 corresponds to the notch 75 in the support 70. The conductor is then introduced into such notches. The operator then positions the assembly above the connecting member and starts to introduce the inserting and extracting member between the bosses 18 and 20. The inserting and extracting member is introduced in the manner disclosed hereinbefore, but when such member arrives at the end of travel (locking by the bosses 18 and 20, which move into the concavities 34), the operator continues to push on the tool. The member 21 being retained in the recess 72, the support 70 remains fixed, but the tool body 66 continues to descend, and this compresses the spring 71. On the other hand, the blade 76, which is connected to the tool member and which can move in relation to the support 70, begins to descend and passes in front of the notches 28 and 75. The edge 79 then cuts the projecting end of the conductor. When the tool is withdrawn, the spring 71 expands and the inserting and extracting member is automatically disengaged from the recess 72, since such member is locked by the bosses 18 and 20. To extract the inserting and extracting member, it is enough to present the other end of the tool, the bosses 67 enabling the member 21 to be seized via the agency of the notches 36 with which its end is formed.

The device according to the invention has many advantages, the main one being to lengthen the life of the conductor, since it is prevented from being planed during its introduction, and the stresses exerted on it are distinctly lower than with the prior art devices. Moreover, the device is very simple and very easy to operate since, even although as many different inserting and extracting members are required as the diameters of the conductors to be connected, they can be inexpensively produced because of their simplicity. Lastly, the device can be applied to any connecting installation, inter alia to primary or subsidiary distribution installations, since a number of devices according to the invention can be connected to a single current supply.

What is claimed is:

1. A device for electrically connecting a cylindrical conductor, said device comprising at least one fork having two members each having a cutting edge, the conductor to be connected being forced in and gripped between said cutting edges, each of said two members having an arm extending therefrom, the device also comprising means for inserting and extracting the conductor to be connected, said means having a shape so as to move the ends of the arms away from one another when the conductor is introduced and keep said arms apart a distance such that the distance apart of the cutting edges at the level of the conductor is slightly less than the diameter of the conductor.

2. A device according to claim 1, wherein each of the arms has a semi-circular boss at its end remote from the fork.

3. A device according to claim 1, wherein said means for inserting and extracting the conductor to be connected comprises two cheeks enclosing a central portion, each of the cheeks comprising a notch enabling the conductor to be connected to be seized, the central portion having a shape such that it has in cross section:

two inclined planes adapted to move the ends of the arms progressively apart when said means is introduced therebetween, two parallel planes connecting with the inclined planes and two concavities connecting with the parallel planes via inclined planes and adapted to receive the bosses.

4. A device according to claim 1, wherein said cutting edge has at one of its ends a small tip enabling insulating material enclosing the conductor to be connected to be cut.

5. A device according to claim 1, wherein each cutting edge is formed with a notch defining a recess receiving the conductor to be connected.

6. A device according to claim 5, wherein the recess is of square cross section.

7. A device according to claim 5, wherein the recess is of circular section.

8. A device according to claim 1, comprising at least two forks having members connected to the same current supply.

9. A device according to claim 1, comprising a tool for manuevering said means for inserting and extracting the conductor to be connected.

10. A device according to claim 9, wherein the tool comprises:

a tool body, a support which is connected via a first spring to the tool body and can make a traversing movement in relation thereto, and a second spring which is attached to the support and is adapted to retain said means for inserting and extracting the conductor to be connected in a recess with which the support is formed.

11. A device according to claim 10, wherein the tool also has a blade having a cutting edge, the blade being connected to the tool body and adapted to slide on a face of the support, so as to cut an end of a cable when it is introduced.

12. A device according to claim 9, wherein the tool has two ends, one end having two bosses adapted to co-operate with two notches with which said means for inserting and extracting the conductor to be connected is formed, so as to facilitate the extraction of said means.

* * * * *